US009987794B2

(12) United States Patent
Whitman et al.

(10) Patent No.: US 9,987,794 B2
(45) Date of Patent: Jun. 5, 2018

(54) THERMOPLASTIC COMPONENTS WITH REDUCED COEFFICIENT OF THERMAL EXPANSION

(71) Applicant: Technifab Incorporated, Avon, OH (US)

(72) Inventors: Bruce D. Whitman, Lorain, OH (US); Martin Likozar, Richmond Heights, OH (US); Steve Kalman, Wellington, OH (US); Cory Kunkel, Mentor, OH (US); Theodore Burdorff, Grafton, OH (US)

(73) Assignee: Technifab, Inc., Avon, OH (US)

( * ) Notice: Subject to any disclaimer, the term of this patent is extended or adjusted under 35 U.S.C. 154(b) by 0 days. days.

(21) Appl. No.: 15/336,981

(22) Filed: Oct. 28, 2016

(65) Prior Publication Data
US 2017/0120508 A1 May 4, 2017

Related U.S. Application Data

(60) Provisional application No. 62/247,828, filed on Oct. 29, 2015.

(51) Int. Cl.
*B29C 65/48* (2006.01)
*B29C 65/00* (2006.01)
(Continued)

(52) U.S. Cl.
CPC .............. *B29C 65/48* (2013.01); *B29C 65/02* (2013.01); *B29C 65/56* (2013.01);
(Continued)

(58) Field of Classification Search
CPC ... B29C 65/48; B29C 65/4895; B29C 65/562; B29C 65/565; B29C 66/4722;
(Continued)

(56) References Cited

U.S. PATENT DOCUMENTS 3,002,534 A  10/1961 Noland
6,326,685 B1  12/2001 Jin et al.
(Continued)

FOREIGN PATENT DOCUMENTS

DE  202010017343 U1  11/2011
WO  2012072991 A2  6/2012

OTHER PUBLICATIONS

International Search Report and Written Opinion for International Application No. PCT/US2016/059278 dated Jan. 27, 2017.

*Primary Examiner* — Michael C Miggins
(74) *Attorney, Agent, or Firm* — Calfee, Halter & Griswold LLP

(57) ABSTRACT

A composite structural component includes a longitudinally extending elongated base element and a plurality of longitudinally extending elongated reinforcing members each secured to the base element along a length of the reinforcing member at spaced apart locations on the base element. The base element is of a first material having a first coefficient of thermal expansion and a first modulus of elasticity. The plurality of longitudinally extending elongated reinforcing members are of a second material having a second coefficient of thermal expansion less than the first coefficient of thermal expansion, and a second modulus of elasticity greater than the first modulus of elasticity, such that the composite structural component has an effective coefficient of thermal expansion in the longitudinal direction that is less than 25% of the first coefficient of thermal expansion.

20 Claims, 7 Drawing Sheets

(51) Int. Cl.
  *B29C 65/02* (2006.01)
  *B29C 65/56* (2006.01)
  *B29L 23/00* (2006.01)

(52) U.S. Cl.
  CPC ...... *B29C 66/1122* (2013.01); *B29C 66/1162* (2013.01); *B29C 66/126* (2013.01); *B29C 66/4322* (2013.01); *B29C 66/4722* (2013.01); *B29C 66/5326* (2013.01); *B29C 66/7392* (2013.01); *B29C 66/73112* (2013.01); *B29C 65/4895* (2013.01); *B29C 65/562* (2013.01); *B29C 65/565* (2013.01); *B29C 66/21* (2013.01); *B29C 66/721* (2013.01); *B29C 66/727* (2013.01); *B29C 66/742* (2013.01); *B29C 66/7444* (2013.01); *B29C 66/7461* (2013.01); *B29C 66/7465* (2013.01); *B29L 2023/00* (2013.01)

(58) Field of Classification Search
  CPC . B29C 66/5326; B29C 66/721; B29C 66/727; B29C 66/73112; B29C 66/7392; B29C 66/742; B29C 66/7444; B29C 66/7461; B29C 66/7465; B29C 65/02; B29C 65/56; B29C 66/1122; B29C 66/1162; B29C 66/126; B29C 66/21; B29L 2023/00
  See application file for complete search history.

(56) References Cited

U.S. PATENT DOCUMENTS

| | | |
|---|---|---|
| 2013/0276959 A1 | 10/2013 | Frantz et al. |
| 2015/0217536 A1 | 8/2015 | Hoefle et al. |

THERMOPLASTIC COMPONENTS WITH REDUCED COEFFICIENT OF THERMAL EXPANSION

CROSS-REFERENCE TO RELATED APPLICATION

This application claims priority to and all benefit of U.S. Provisional Patent Application Ser. No. 62/247,828, filed on Oct. 29, 2015, for THERMOPLASTIC COMPONENTS WITH REDUCED COEFFICIENT OF THERMAL EXPANSION, the entire disclosure of which is fully incorporated herein by reference.

BACKGROUND

In the aviation and aerospace industries, devices and their package structures consist of a variety of metallic, ceramic, plastic, or composite components with vastly different coefficients of thermal expansion (CTE). Mechanical failures in such devices can be caused by thermal expansion mismatch among the materials during fabrication or service.

Lightweight thermoplastic materials (e.g., thermoplastic foams) are commonly applied in the aerospace and aviation industries to the manufacture of ducts, seals, and other components. These materials have a characteristically higher CTE than the surrounding structural elements to which the thermoplastic components are connected. For example, thermoplastic foams typically have a CTE of about $75\text{-}150 \times 10^{-6}/°$ F. (or 75-150 $\mu/°$ F.), and other thermoplastics (e.g., nylon, ABS, PVC) typically have a CTE of about 30-60 $\mu/°$ F., as compared to other common system materials, such as aluminum (about 13 $\mu/°$ F.) and steel (about 7 $\mu/°$ F.). A problem that may arise is thermally induced stress transferred to adjacent components with mismatched CTE. While mismatched expansion or contraction of thermoplastic parts may be mitigated by bonding these parts along their entire length to an adjacent structure with lower CTE, such attachment may cause the thermoplastic part to become anisotropic or demonstrate a weak axis of bending, which could cause the thermoplastic part to warp or otherwise deform through normal handling and use.

SUMMARY

The present application contemplates the construction and use of structural components (e.g., ducts) formed from a material having a high CTE and reinforced with reinforcing members formed from a material having a lower CTE, to produce a composite structural component having a desired effective CTE (e.g., a CTE that approximates or approaches the CTE of one or more components with which the composite structural component is connected). Accordingly, in one exemplary embodiment, a composite structural component includes a longitudinally extending elongated base element and a plurality of longitudinally extending elongated reinforcing members each secured to the base element along a length of the reinforcing member at spaced apart locations on the thermoplastic element. The base element is of a first material having a first coefficient of thermal expansion and a first modulus of elasticity. The plurality of longitudinally extending elongated reinforcing members are of a second material having a second coefficient of thermal expansion less than the first coefficient of thermal expansion, and a second modulus of elasticity greater than the first modulus of elasticity, such that the composite structural component has an effective coefficient of thermal expansion in the longitudinal direction that is significantly less than the first coefficient of thermal expansion (e.g., less than 50% of the first coefficient of thermal expansion, less than 25% of the first coefficient of thermal expansion, or less than 15% of the first coefficient of thermal expansion).

In another exemplary embodiment, a method of forming a composite duct is contemplated. In the exemplary method, a sheet of thermoplastic material is provided, having first and second opposed surfaces extending to first and second edges, with the thermoplastic material having a first coefficient of thermal expansion and a first modulus of elasticity. The first and second edges are joined along a seam to form a duct, with the first sheet surface facing inward and the second sheet surface facing outward. A plurality of elongated reinforcing members are secured to the sheet of thermoplastic material at spaced apart locations, with the secured plurality of elongated reinforcing members extending in the longitudinal direction. The plurality of elongated reinforcing members are formed from a reinforcing material having a second coefficient of thermal expansion less than the first coefficient of thermal expansion and a second modulus of elasticity greater than the first coefficient of thermal expansion, such that the composite duct has an effective coefficient of thermal expansion in the longitudinal direction that is significantly less than the first coefficient of thermal expansion (e.g., less than 50% of the first coefficient of thermal expansion, less than 25% of the first coefficient of thermal expansion, or less than 15% of the first coefficient of thermal expansion).

In another exemplary embodiment, a structural assembly includes a support member of a first material having a first coefficient of thermal expansion and a first modulus of elasticity, and a composite structural component connected to the support member. The composite structural component includes a base element and a plurality of longitudinally extending reinforcing members, each secured to the base element along a length of the reinforcing member at spaced apart locations on the base element. The base element is of a second material having a second coefficient of thermal expansion and a second modulus of elasticity, with the second coefficient of thermal expansion being greater than the first coefficient of thermal expansion. The base element extends longitudinally along the length of the composite structural component. The plurality of longitudinally extending reinforcing members are of a third material having a third coefficient of thermal expansion less than the second coefficient of thermal expansion, and a third modulus of elasticity greater than the second modulus of elasticity, such that the composite structural component has an effective coefficient of thermal expansion in the longitudinal direction that approaches the first coefficient of thermal expansion (e.g., within 30 $\mu/°$ F., within 10 $\mu/°$ F., or within 5 $\mu/°$ F.).

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention, wherein.

DETAILED DESCRIPTION

Figure 1:
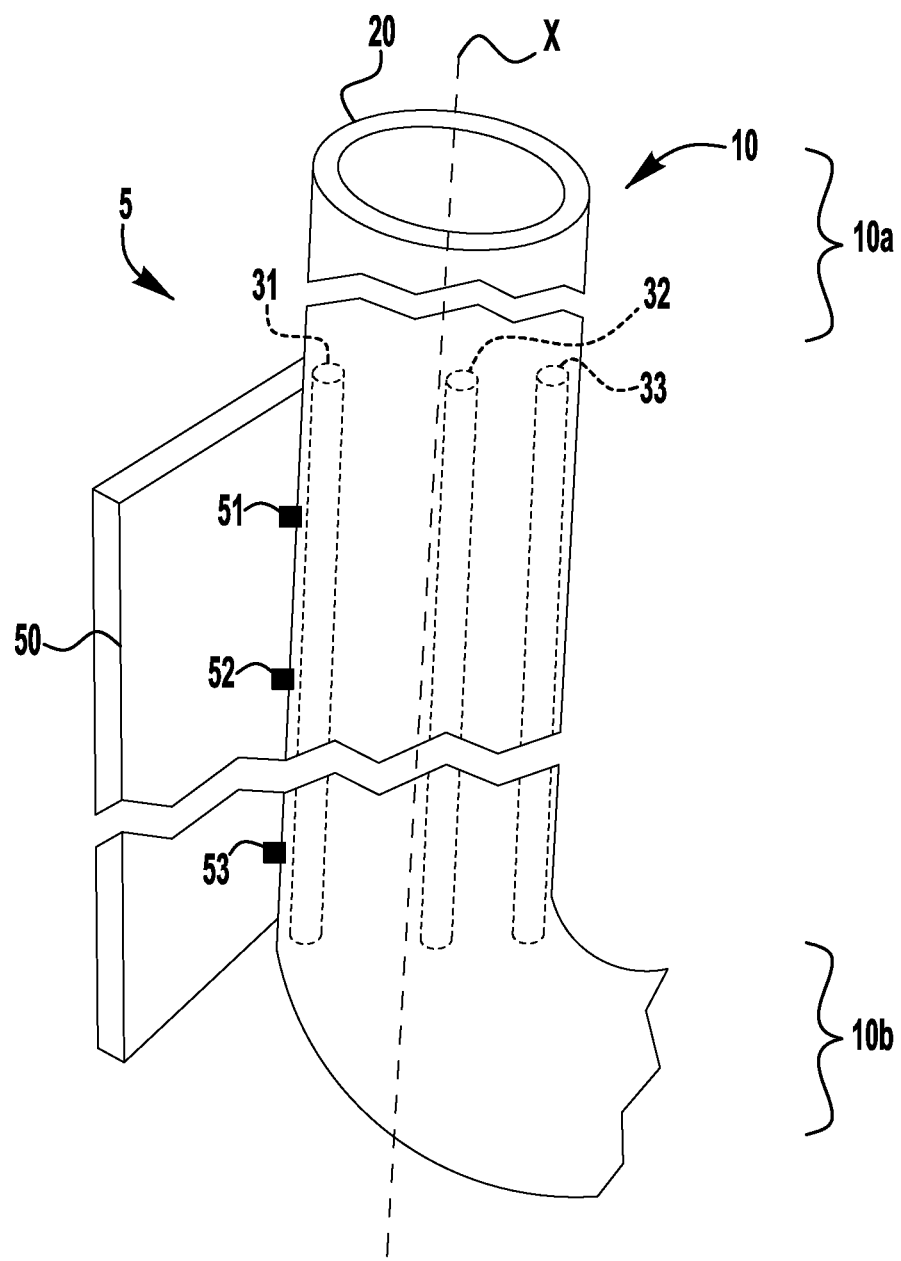
FIG. 1 is a perspective schematic view of an assembly including a composite component connected along its length with a structural element.

The present application is directed towards systems and arrangements in which structural components formed from materials having a high coefficient of thermal expansion (CTE), such as thermoplastic foam (e.g., PVDF) are subjected to large fluctuations in temperature, for example, temperatures ranging from −65° F. to 300° F., or from −65° F. to 160° F. The application contemplates a variety of arrangements in which low CTE reinforcing members are secured to a high CTE base element of a system component, either to minimize the effective CTE of the composite (i.e., base member with reinforcements) component, or to selectively modify the effective CTE to approximate (e.g., within 30 $\mu/°$ F., within 10 $\mu/°$ F., or within 5 $\mu/°$ F.) the CTE of a structural component with which the composite component is connected over at least a portion of its length. Exemplary applications include, for example, aviation and aerospace applications in which lightweight thermoplastic foam ducts are reinforced with low CTE reinforcing strips to provide a lightweight composite duct having a lower effective CTE, as compared to an unreinforced thermoplastic foam duct, and in some applications, an effective CTE that more closely matches the CTE of a component with which the composite duct is connected. The inventive features described herein may additionally or alternatively be used in a wide variety of other applications, including, for example, other types of high CTE materials (e.g., other thermoplastics, including, for example, nylon, polypropylene, and polyethylene), other types of components (e.g., seals, brackets, panels), and other types of temperature varying applications.

According to an aspect of the present application, a structural component constructed from a high CTE material may be constructed, adapted or otherwise produced with reinforcing members of a low CTE material to produce a composite component having a reduced effective CTE, to reduce thermal expansion (or contraction) during thermal cycling of the component. Where the structural component is an elongated, substantially linear component (e.g., a straight duct), the reinforcing members may be secured to the component to extend longitudinally along the length of the component, with the reinforcing members arranged across and/or around the component.

Applicants have determined that the effective linear coefficient of thermal expansion of a uniform linear reinforced component ($CTE_{eff}$) may be approximated as:

$$CTE_{eff} = \frac{(CTE_d)(E_d)(A_d) + (CTE_r)(E_r)(A_r)}{(E_d)(A_d) + (E_r)(A_r)}$$

in which $CTE_d$ is the coefficient of thermal expansion of the high CTE base element duct material, $E_d$ is the modulus of elasticity of the duct material, $A_d$ is the cross-sectional area of the duct, $CTE_r$ is the coefficient of thermal expansion of the reinforcing member material, $E_r$ is the modulus of elasticity of the reinforcing member material, and $A_r$ is the total (combined) cross-sectional area of the reinforcing members. As can be appreciated from this formula, the contribution of the reinforcing members to the effective CTE may be increased by increasing the total cross-sectional area of the reinforcing members (generally not preferred due to size, weight, and material cost considerations) or by increasing the modulus of elasticity of the reinforcing members.

By utilizing a reinforcing member material having a relatively low CTE (e.g., less than 60 $\mu/°$ F., less than 40 $\mu/°$ F., less than 20 $\mu/°$ F., or less than 10 $\mu/°$ F.) and a relatively high modulus of elasticity (e.g., greater than 300 KSI, greater than 500 KSI, greater than 5000 KSI, or greater than 10,000 KSI), the effective CTE of the composite component is significantly reduced by the reinforcing members (e.g., such that $CTE_{eff}$ is less than 50% of $CTE_d$, less than 25% of $CTE_d$, or less than 15% of $CTE_d$, even if the reinforcing members are relatively small in cross-sectional area (as compared to the duct). Where the duct is constructed of a material having a very small modulus of elasticity (e.g., less than 50 KSI, less than 10 KSI, or less than 1 KSI), such as, for example, thermoplastic foam (having a modulus of elasticity of approximately 0.5 KSI) and the reinforcing members are constructed of a material having a very large modulus of elasticity, such as, for example, carbon fiber/thermoplastic composites (having a modulus of elasticity of in the range of 5000-10,000 KSI) or aluminum (having a modulus of elasticity of approximately 10,000 KSI), the effective CTE of the composite duct approaches the CTE of the reinforcing members (e.g., within 10%, 5%, or 1% of $CTE_r$), even where the total cross-sectional area of the reinforcing members is very small (e.g., less than 5%, 3%, or 1% of the cross-sectional area of the duct). This allows for the use of minimal amounts of reinforcing material (as compared to a sheath or wrap around the entire high CTE material component), minimizing material costs and component weight. A variety of materials having a relatively low CTE (at least compared to thermoplastic foam) and a relatively high modulus of elasticity may be used, including, for example, thermoplastics (e.g., Ultem®), composites of fiber (e.g., carbon fiber, glass fiber, aramid fiber) and thermoplastic (e.g., PEKK), fiber reinforced thermosets (e.g., fiberglass reinforced polyester), ceramics, and metals (e.g., aluminum, steel). As one example, a fiber (e.g., carbon fiber, glass fiber, aramid fiber) may be encapsulated in thermoplastic, thermosetting plastic, or epoxy to form the reinforcing composite.

FIG. 1 schematically illustrates a structural assembly 5 of a reinforced thermoplastic (or other high CTE material)

composite component 10, reinforced with one or more reinforcing members 31, 32, 33 along a length of the component, and connected with a lower CTE structural member 50 (e.g., a wall, frame, or other structural component) at one or more locations 51, 52, 53 (either discrete or continuous) along the length of the composite component. These connections may comprise, for example, fasteners, brackets, clamps, fluid couplings, or other such components or arrangements. A conventional structural support component (e.g., an airframe) is typically provided in a material having a relatively low coefficient of thermal expansion (e.g., less than 15 $\mu/°$ F.), such as a fiber/thermoplastic composite (e.g., carbon, aramid or glass fiber composites) or a metal (e.g., aluminum, steel, or titanium). To minimize any thermal expansion mismatch between the composite component 10 and the connected structural member 50, one or more of the number, size, and material of the reinforcing members 31, 32, 33 secured to the high CTE material (e.g., thermoplastic foam) base element 20 of the composite component 10 may be selected such that the effective CTE of the composite component 10 approximates or approaches the CTE of the connected structural component 50 (e.g., within 30 $\mu/°$ F., within 10 $\mu/°$ F., or within 5 $\mu/°$ F.), at least along the connected portions of the two components 10, 50, and at least along the elongated, longitudinally extending portions of the composite component 10. As one example, by limiting the differential CTE of the composite component 10 and the structural component 50 to 30 $\mu/°$ F., the thermal expansion mismatch of a 4 foot long composite component (relative to the connected structural component) is limited to approximately 0.32 inches when exposed to a 225° F. change in temperature.

As shown, in some applications, where a portion 10*a* of the composite component 10 is not attached to an external structure, this portion of the component may optionally be provided without reinforcement where the unmodified expansion or contraction of this portion of the component will not produce a significant thermal expansion mismatch or other undesirable stresses. Additionally or alternatively, in applications where the component 10 includes non-longitudinally extending portions 10*b* (e.g., bends, flanges, etc.), these portions of the composite component may optionally be provided without reinforcement where the contribution to thermal expansion in the longitudinal direction of these portions is not significant. Further, while the reinforcing members are shown as extending over the entire length of the linear, longitudinally extending portions of the composite component, in other embodiments, the reinforcement member may extend along only a portion of the linear, longitudinally extending component portions (e.g., as is sufficient to achieve a desired effective CTE). Further, the reinforcing members may form discontinuous, longitudinally extending segments along the linear, longitudinally extending component portions (e.g., as is sufficient to achieve a desired effective CTE).

While reinforcing members may be secured to a high CTE component in any suitable arrangement, in one embodiment, a plurality of longitudinally extending reinforcing members are substantially evenly spaced around a centroid of the high CTE component, to avoid non-uniform thermal expansion/contraction, the formation of a weak bending axis, or other anisotropic behavior of the component. In an exemplary embodiment, as shown in FIG. 1, at least three low CTE material reinforcing members 31, 32, 33 are secured to the high CTE material base element 20 at locations evenly spaced about the longitudinal center line or axis X of the base element 20.

The base element may form a wide variety of shapes in cross-section, including circular, square, rectangular, or irregular shaped (e.g., L-shaped, T-shaped), and may be solid or hollow. In an exemplary embodiment, the base element is a tubular cylindrical duct. While the base elements shown herein are described as having a substantially uniform cross-sectional shape along their entire length, in other embodiments, a base element may be non-uniform in shape along its length (for example, having enlarged, necked down, flanged, or otherwise discontinuously shaped portions along its length).

A thermoplastic cylindrical duct may be formed using a variety of processes, including, for example, machining, extruding, molding, and welding. In an exemplary embodiment, a sheet of thermoplastic material is molded into a tubular element in which first and second edges of the sheet are joined along a seam, for example, by thermal welding or adhesive bonding the first and second edges together. The edges of the sheet may be beveled, crenulated, or otherwise shaped to facilitate formation of a seam having a wall thickness substantially uniform with the wall thickness of the sheet. Exemplary methods for forming a cylindrical duct from a sheet of thermoplastic foam material are described, for example, in U.S. Patent Application Pub. No. 2008/0308674, the entire disclosure of which is incorporated herein by reference.

Reinforcing members may be attached to, embedded in, or otherwise secured to a thermoplastic base duct member using a variety of arrangements. Exemplary embodiments of reinforcing members secured to cylindrical duct base elements are disclosed in FIGS. 2-11 and described below. Many of these embodiments may additionally or alternatively be used to secure reinforcing members to different shaped base elements, including, for example, different shaped (e.g., square, rectangular, oval) hollow base elements or ducts, different shaped solid base elements, and irregularly shaped or non-uniform base elements.

Figure 2:
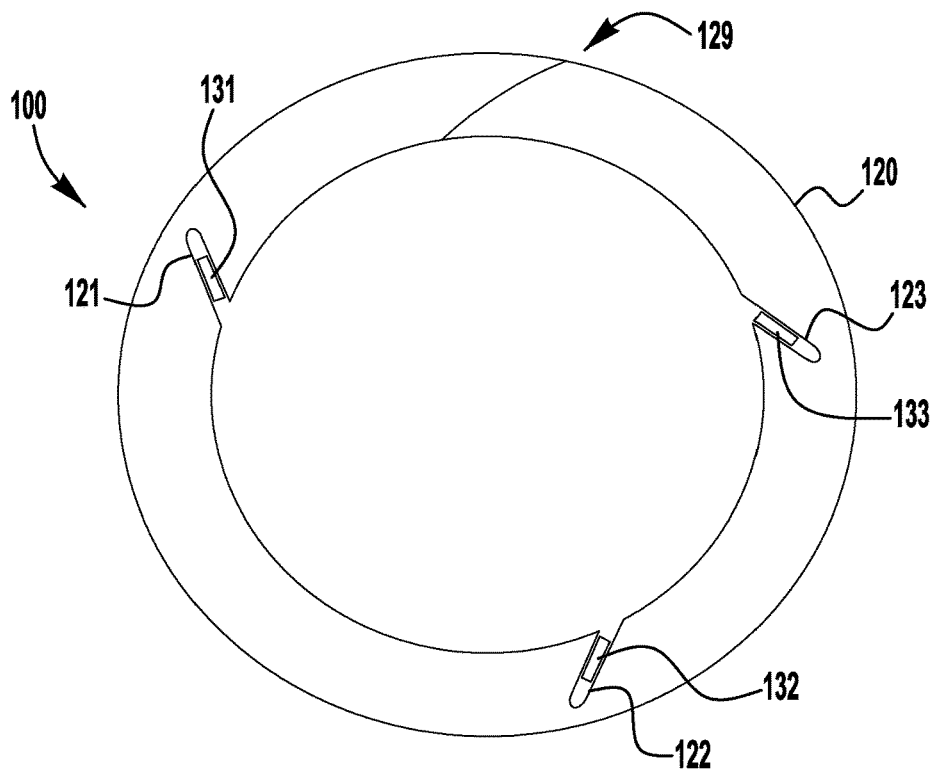
FIG. 2 is a cross-sectional schematic end view of a composite duct, in accordance with an exemplary embodiment.

In one embodiment, as shown in FIG. 2, a composite duct 100 may include a cylindrical tubular base element 120 (formed, for example, from a rolled sheet of thermoplastic material joined along a seam portion 129) having series of longitudinal slits 121, 122, 123 formed in a longitudinally extending surface of the base element 120 and sized to retain the reinforcing members 131, 132, 133 therein. While the reinforcing members may be provided in a variety of cross-sectional shapes (e.g., rectangular, circular, wedge-shaped, or more irregular cross-sections), in one embodiment, as shown, the reinforcing members 131, 132, 133 are substantially flat strips sized to fit in the relatively narrow slits 121, 122, 123 and to provide sufficient surface contact with the slits for adhesion (both the retain the strip and to strengthen the slit portions of the duct). The slits may be provided at a suitable depth to receive the reinforcing members and be resealed (e.g., using adhesive, thermal bonding, or some other suitable process) without compromising the structural integrity of the duct 100, and may be angled with respect to the wall thickness to provide a suitable depth without cutting through the entire wall thickness of the duct. The slits may be spaced apart from the seam portion 129 of the tubular base element 120, for example, to avoid disrupting or otherwise compromising the seam seal.

Figure 2A:
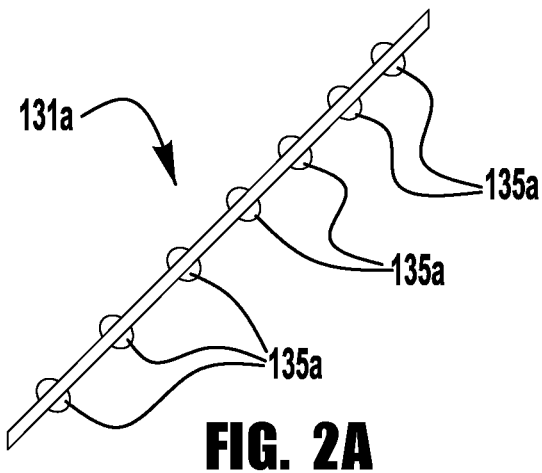
FIG. 2A is a perspective view of a reinforcing member for a composite component, in accordance with an exemplary embodiment.
Figure 2B:
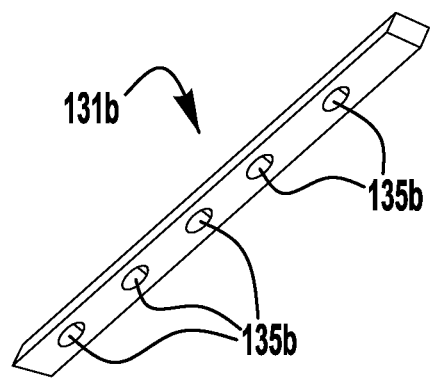
FIG. 2B is a perspective view of another reinforcing member for a composite component, in accordance with an exemplary embodiment.

The reinforcing members may be retained in the slits and secured to the base element material along the length of the reinforcing member, for example, using an adhesive, thermal bond, friction and/or interference fit, or deformation of the heated base element material into apertures or other such features of the reinforcing member. In one exemplary embodiment, as shown in FIG. 2A, a reinforcing member 131*a* may include protuberances 135*a* or other discontinuities that provide an interference or friction fit with the base element material, particularly if the base element material is permitted to flow or deform around these protuberances 135*a*. In another exemplary embodiment, as shown in FIG. 2B, a reinforcing member 131*b* may include recesses 135*b* or other discontinuities that provide an interference or friction fit with the base element material, particularly if the base element material is permitted to flow or deform into these recesses 135*b*.

While any number of reinforcing members may be provided, in one embodiment, at least three reinforcing members are utilized (e.g., between three and eight reinforcing members). The number of reinforcing members secured to the base element may depend, for example, on the size of the base element (with more reinforcing members used with a larger base element), the cross-sectional shape of the base element (with more reinforcing members used to limit thermal expansion/contraction on discrete irregular portions of the base element), the size of the reinforcing members (i.e., fewer larger reinforcing members or more smaller reinforcing members), and the amount that the CTE needs to be reduced (with more reinforcing members used to provide a greater reduction in the effective CTE). In some applications, the use of a greater number of reinforcing members around the periphery of the composite component may provide for a more uniform adjusted effective CTE over the entire cross-section of the component. For example, by using eight reinforcing members positioned at 45° increments around a cylindrical component instead of three reinforcing members positioned at 120° increments, the portions of the base element between the reinforcing members may be less affected by deviations in local thermal expansion. Also, while the exemplary embodiments described herein include reinforcing members of uniform length, cross-sectional shape, and material, in other embodiments, the reinforcing members in a composite component may have differing lengths, cross-sectional shapes, and materials, for example, to balance the thermal expansion of different portions of the composite component cross-section.

The longitudinal slits 121, 122, 123 may be formed in the base element 120 in a variety of ways, including machining, mechanical cutting, and thermal cutting (e.g., by pressing a heated reinforcing member against the thermoplastic foam duct to form a slit closely receiving the heated reinforcing member. Where the base element is formed from a heat rolled sheet of thermoplastic material, the slits may be formed in the sheet prior to rolling, or in the formed base element duct. Likewise, the reinforcing members 131, 132, 133 may be installed in the slits in the sheet prior to rolling or after the sheet has been rolled to form the cylindrical duct.

Figure 3:
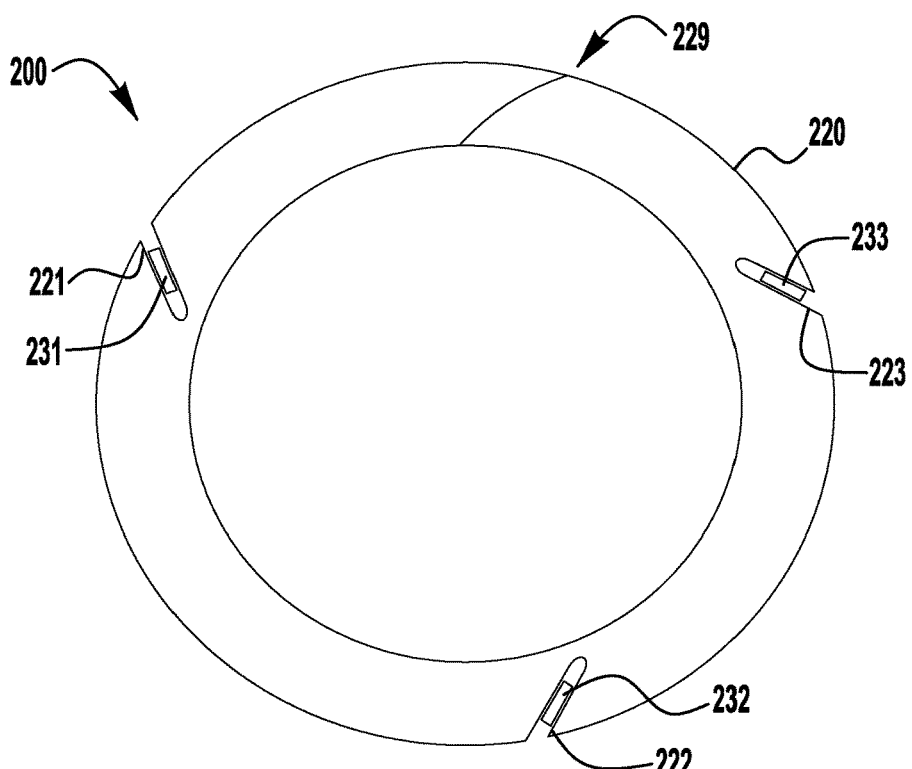
FIG. 3 is a cross-sectional end view of another composite duct, in accordance with an exemplary embodiment.

In the embodiment of FIG. 2, the longitudinal slits 121, 122, 123 are formed in an interior surface of the tubular base element 120. In another embodiment, as shown in FIG. 3, a composite duct 200 may include a cylindrical tube base element 220 (formed, for example, from a rolled sheet of thermoplastic material joined along a seam portion 229) having a series of longitudinal slits 221, 222, 223 formed in an exterior surface of the tubular base element 220 and sized to retain the reinforcing members 231, 232, 233 therein, using any of the variety of arrangements and processes described above. In still other embodiments (not shown), a base element may be provided with slits in both the outer and inner surfaces of the base element, for retention of outer peripheral and inner peripheral reinforcing members. Such an arrangement may be desirable for hollow composite components having especially large wall thicknesses, to minimize any thermal expansion mismatch between the outer and inner surfaces of the duct.

Figure 4:
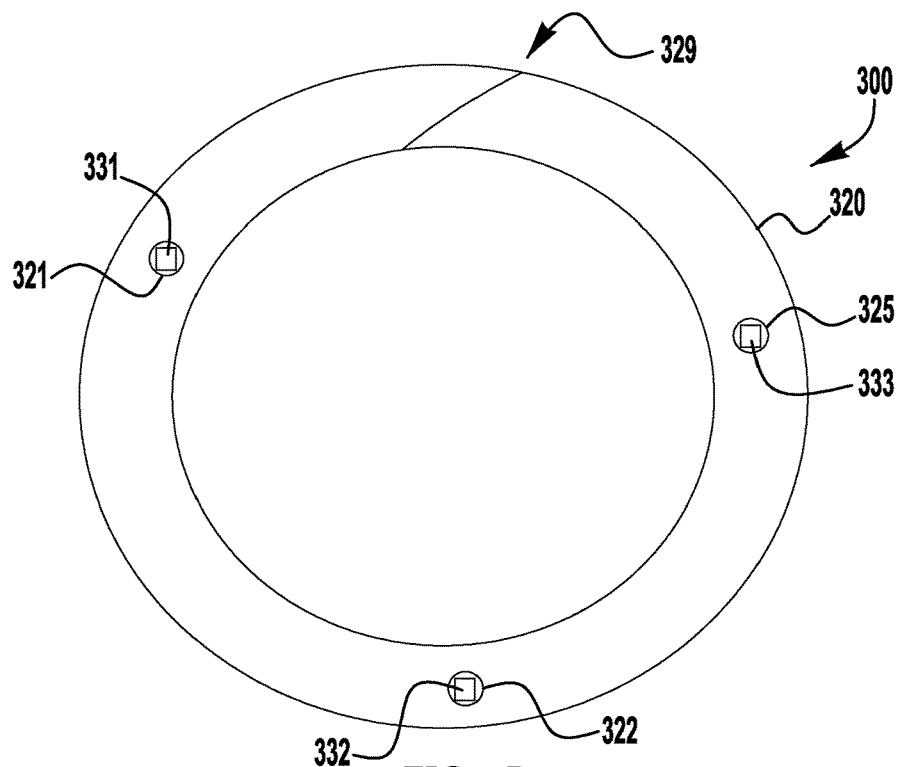
FIG. 4 is a cross-sectional end view of another composite duct, in accordance with an exemplary embodiment.

In another embodiment, reinforcing members may be fully embedded in or surrounded by the base element material, for example, by inserting the reinforcing members in longitudinally extending bores machined, drilled, or otherwise formed in the base element (either in the finished base element or in a sheet of material to be rolled or otherwise formed into the base element duct or other such shape). In the embodiment of FIG. 4, a composite duct 300 includes a cylindrical tubular base element 320 (formed, for example, from a rolled sheet of thermoplastic material joined along a seam portion 329) having a series of longitudinal bores 321, 322, 323 sized to retain reinforcing members 331, 332, 333. The reinforcing members may be secured in the bores by adhesive bonding, thermal bonding, interference fit with the deformed base element material, or any other suitable arrangement. While shown at a uniform distance from the center line of the duct, in other embodiments, the reinforcing members may be positioned at varying distances from the center line, for example, to minimize any thermal expansion mismatch across the cross-section of the composite component.

Figure 5:
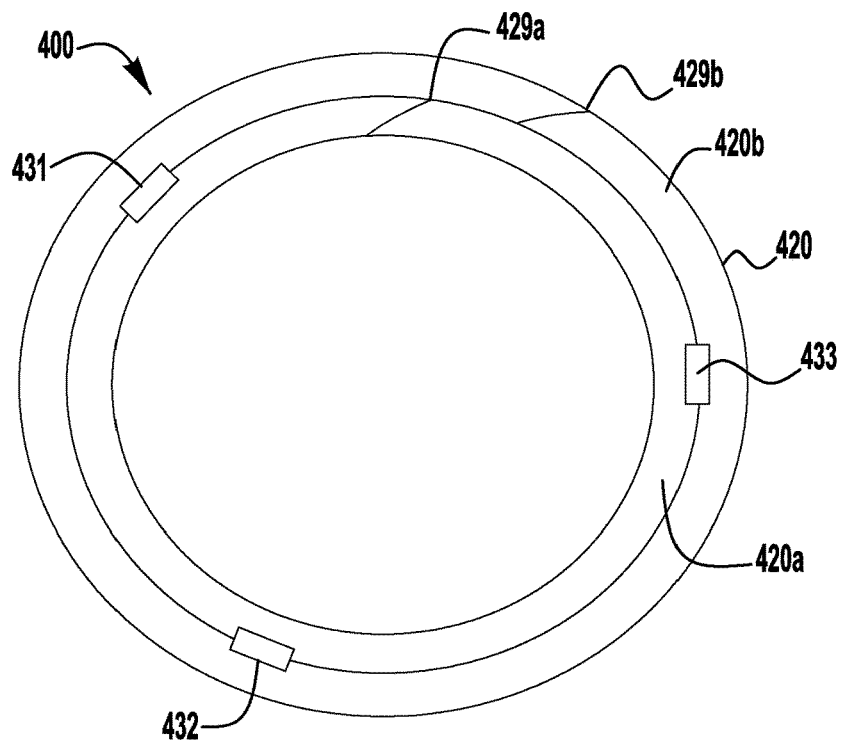
FIG. 5 is a cross-sectional end view of another composite duct, in accordance with an exemplary embodiment.

In another embodiment, reinforcing members may be bonded between plies or sheets of a multiple layer or laminated base element duct. In one such embodiment, one or more sheets of the base element material (e.g., separate sheets, or a spiral wrapped sheet) may form separate cylindrical layers of the base element, with the reinforcing members being bonded or sandwiched between the cylindrical layers. In the embodiment of FIG. 5, a composite duct 400 includes a base element 420 including an inner cylindrical layer 420*a* (formed, for example, from a rolled sheet of thermoplastic material joined along a seam portion 429*a*) and an outer cylindrical layer 420*b* (formed, for example, from a rolled sheet of thermoplastic material joined along a seam portion 429*b*), and reinforcing members 431, 432, 433 equally spaced around the circumference of the base element 420 and bonded between the inner and outer layers 420*a*, 420*b*. As shown, the reinforcing members 431, 432, 433 may be formed as relatively flat strips of material to facilitate bonding between the laminated base element layers. The reinforcing strips may be secured in place, prior to duct lamination, by adhesive, thermal bonding, or any other suitable arrangement. While the inner and outer cylindrical layers 420*a*, 420*b* may be formed from the same material (e.g., the same thermoplastic foam material), in another embodiment, the inner and outer cylindrical layers may be formed from different materials, which may (but need not) have different coefficients of thermal expansion. In one such example, the reinforcing members bonded between the base element layers may serve to mitigate the thermal expansion mismatch of the two layers.

Figure 6:
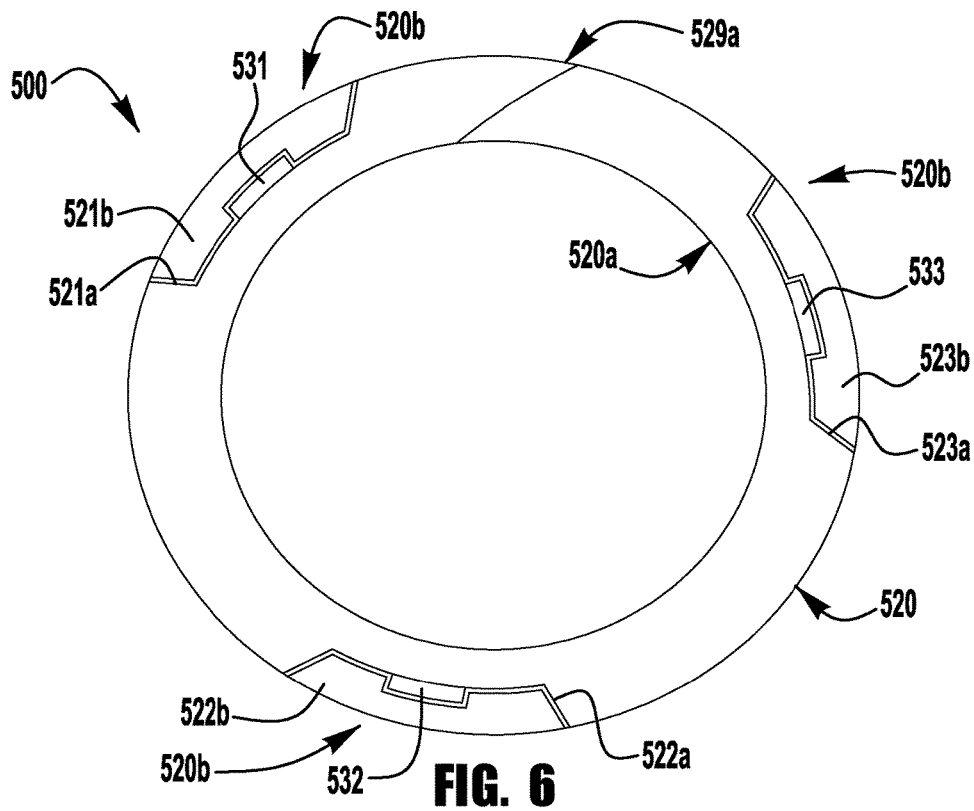
FIG. 6 is a cross-sectional end view of another composite duct, in accordance with an exemplary embodiment.

In another such embodiment, one or more longitudinally extending strips of a base element material may be bonded against a cylindrical layer of the base element to cover and effectively embed the reinforcing members. In the embodiment of FIG. 6, a composite duct 500 includes a base element 520 having an inner cylindrical layer 520*a* (formed, for example, from a rolled sheet of thermoplastic material joined along a seam portion 529*a*) and a discontinuous outer layer 520*b* including a plurality of longitudinally extending strips 521*b*, 522*b*, 523*b* bonded against the outer surface of the inner cylindrical layer 520*a* to cover corresponding reinforcing members 531, 532, 533 equally spaced around the circumference of the base element 520 and captured between the inner and outer layers 520a, 520b. As shown, the strips 521b, 522b, 523b may be retained in complementary shaped recesses 521a, 522a, 523a in the outer surface of the inner cylindrical layer 520a to provide a base element duct having a substantially uniform wall thickness. In other embodiments (not shown), strips of base element material may be bonded to a non-recessed exterior surface of the inner cylindrical layer. As shown, the reinforcing members 531, 532, 533 may be formed as relatively flat strips of material to facilitate bonding between the laminated base element layers. The reinforcing strips may be secured in place, prior to duct lamination, by adhesive, thermal bonding, or any other suitable arrangement. While the inner and outer layers 520a, 520b may be formed from the same material (e.g., the same thermoplastic foam material), in another embodiment, the inner and outer layers may be formed from different materials, which may (but need not) have different coefficients of thermal expansion. In one such example, the reinforcing members bonded between the base element layers may serve to mitigate the thermal expansion mismatch of the two layers.

Figure 7:
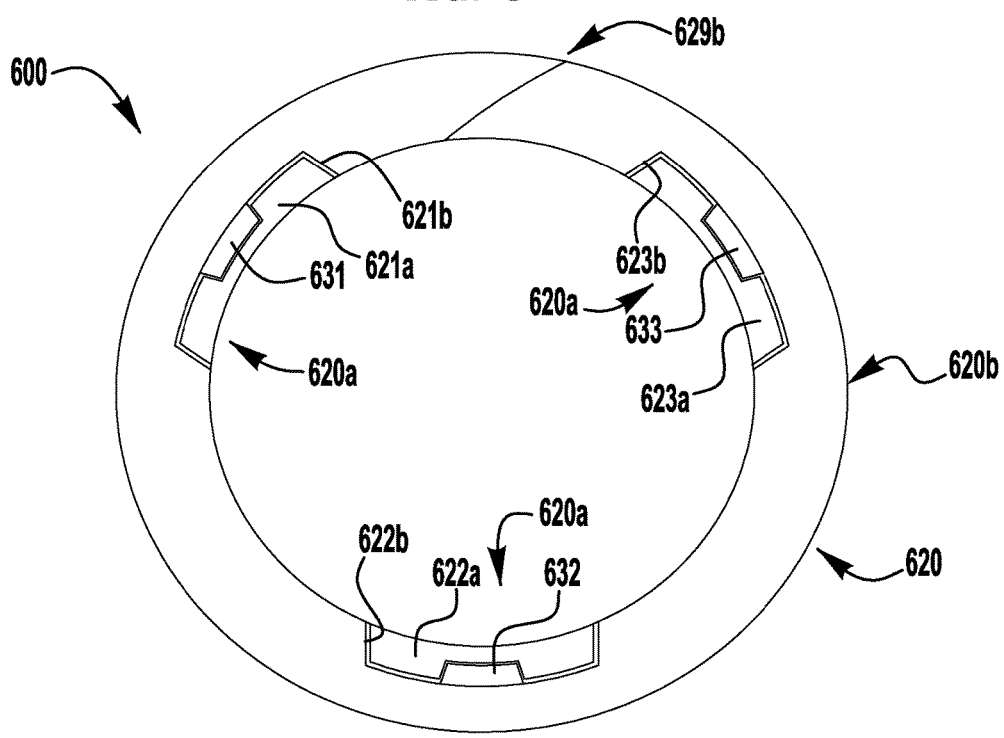
FIG. 7 is a cross-sectional end view of another composite duct, in accordance with an exemplary embodiment.

In another embodiment, as shown in FIG. 7, a composite duct 600 includes a base element 620 having an outer cylindrical layer 620b (formed, for example, from a rolled sheet of thermoplastic material joined along a seam portion 629b) and a discontinuous inner layer 620a including a plurality of longitudinally extending strips 621a, 622a, 623a bonded against the inner surface of the outer cylindrical layer 620b to cover corresponding reinforcing members 631, 632, 633 equally spaced around the circumference of the base element 620 and captured between the inner and outer layers 620a, 620b. As shown, the strips 621a, 622a, 623a may be retained in complementary shaped recesses 621b, 622b, 623b in the inner surface of the outer cylindrical layer 620b to provide a base element duct having a substantially uniform wall thickness. In other embodiments (not shown), strips of base element material may be bonded to a non-recessed interior surface of the outer cylindrical layer. As shown, the reinforcing members 631, 632, 633 may be formed as relatively flat strips of material to facilitate bonding between the laminated base element layers. The reinforcing strips may be secured in place, prior to duct lamination, by adhesive, thermal bonding, or any other suitable arrangement. While the inner and outer layers 620a, 620b may be formed from the same material (e.g., the same thermoplastic foam material), in another embodiment, the inner and outer layers may be formed from different materials, which may (but need not) have different coefficients of thermal expansion. In one such example, the reinforcing members bonded between the base element layers may serve to mitigate the thermal expansion mismatch of the two layers.

In another embodiment, reinforcing members may be directly bonded (e.g., by adhesive or thermal bonding) to a surface of the base element in a longitudinal direction to extend along a length of the base element. In such an embodiment, the reinforcing members may be formed as relatively flat strips of material to minimize changes to the cross-sectional shape of the composite duct. Additionally or alternatively, the reinforcing members may be at least partially pressed into the based element material (e.g., when the material is in a softened, heated condition), to facilitate adhesion of the reinforcing members and/or to minimize changes to the cross-sectional shape of the composite duct. The reinforcing strips may be secured in place by adhesive bonding, thermal bonding, interference fit with the deformed base element material, adhesive tape (e.g., metallized tape) applied over the reinforcing member and adjacent base element surfaces, or any other suitable arrangement.

Figure 8:
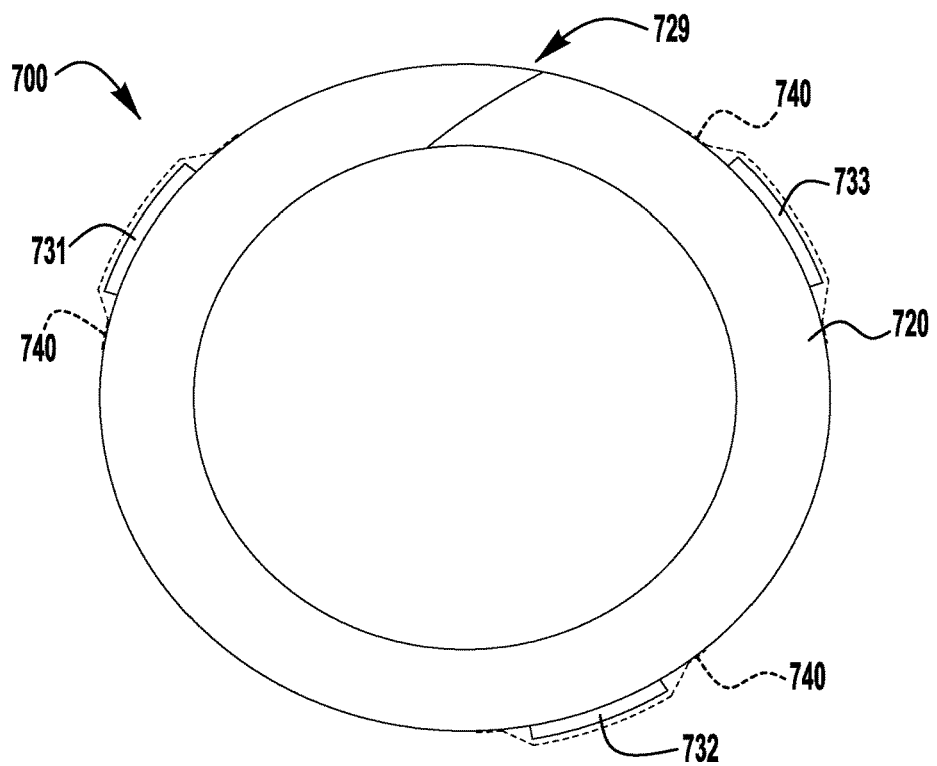
FIG. 8 is a cross-sectional end view of another composite duct, in accordance with an exemplary embodiment.
Figure 9:
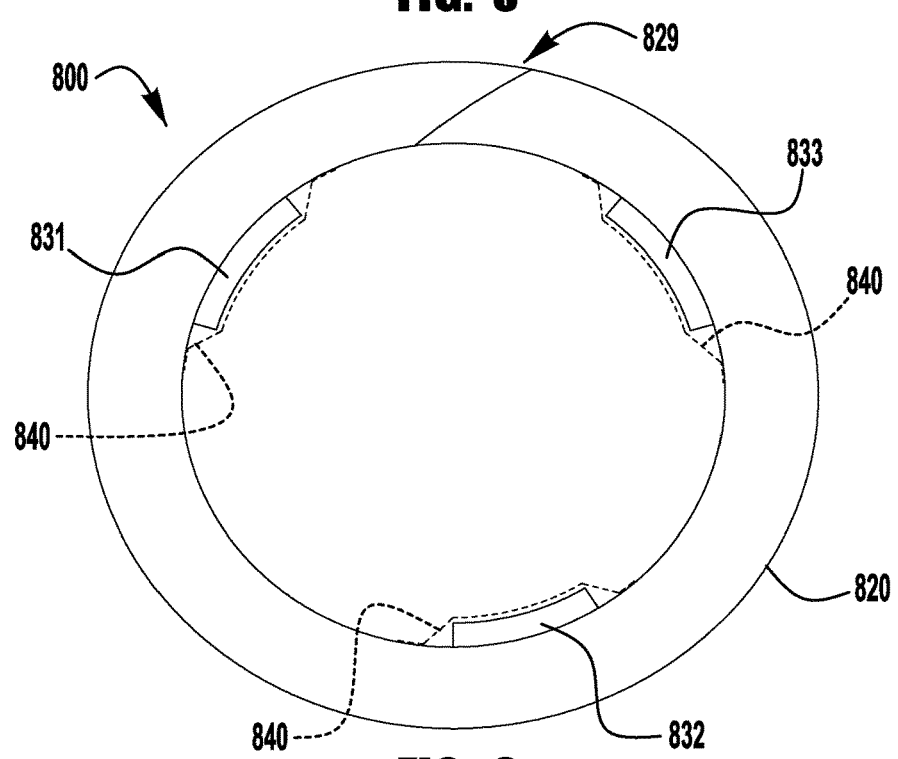
FIG. 9 is a cross-sectional end view of another composite duct, in accordance with an exemplary embodiment.

In the embodiment of FIG. 8, a composite duct 700 includes a tubular duct base element 720 (formed, for example, from a rolled sheet of thermoplastic material joined along a seam portion 729) and a plurality of longitudinally extending reinforcing members 731, 732, 733 directly bonded to an outer surface of the base element 720 and evenly spaced around the periphery of the base element. The reinforcing strips may be secured in place by adhesive bonding, thermal bonding, interference fit with the deformed base element material, adhesive tape 740 (e.g., metallized tape) applied over the reinforcing member and adjacent base element surfaces, or any other suitable arrangement. In the embodiment of FIG. 9, a composite duct 800 includes a tubular duct base element 820 (formed, for example, from a rolled sheet of thermoplastic material joined along a seam portion 829) and a plurality of longitudinally extending reinforcing members 831, 832, 833 directly bonded to an inner surface of the base element 820 and evenly spaced around the periphery of the base element. The reinforcing strips may be secured in place by adhesive bonding, thermal bonding, interference fit with the deformed base element material, adhesive tape 840 (e.g., metallized tape) applied over the reinforcing member and adjacent base element surfaces, or any other suitable arrangement. In still other embodiments (not shown), a base element may be provided with reinforcing strips bonded to both the outer and inner surfaces of the base element. Such an arrangement may be desirable for hollow composite components having especially large wall thicknesses, to minimize any thermal expansion mismatch between the outer and inner surfaces of the duct.

In the exemplary embodiments of FIGS. 1-9, the reinforcing members are limited to longitudinally extending members spaced apart from each other, and not interconnected with each other. In this arrangement, the amount and weight of reinforcing material may be minimized while effectively reducing or otherwise controlling thermal expansion in the longitudinal direction, the primary dimension along which the elongated component would have experienced thermal expansion. In other embodiments, a high CTE material component that extends substantially in two directions (e.g., both longitudinal and lateral directions, as is the case with a plate shaped member) may include reinforcing members that extend in these two directions, to reduce the effective CTE in both directions.

In still other embodiments, interconnected reinforcing members may be utilized to facilitate attachment of a large number of reinforcing members to the base element (e.g., to the outer surface, inner surface, or embedded between layers of a base element duct). In the exemplary embodiment of FIG. 10, a composite duct 900 includes a cylindrical tubular base element 920 (formed, for example, from a rolled sheet of thermoplastic material joined along a seam portion 929) having a reinforcing mesh 930 secured to an outer surface of the base element 920, for example, by adhesive bonding, thermal bonding, interference fit with the deformed base element material, a second base element layer (which may be similar to the embodiment of FIG. 5), or any other suitable arrangement. The exemplary mesh 920 includes longitudinally extending parallel reinforcing strands 931 and laterally or circumferentially extending parallel connecting strands 932. In one embodiment, the entire mesh is provided in a low CTE, high modulus of elasticity reinforcing material for improvement of the effective CTE. In another embodiment, the reinforcing strands 931 are provided in a low CTE, high modulus of elasticity reinforcing material, and the connecting strands 932 are provided in another, non-critical material (which may have a high CTE or a low modulus of elasticity), as the circumferentially extending connecting strands do not significantly contribute to the effective longitudinal CTE. The large number of smaller reinforcing strands 931 positioned around the circumference of the composite duct 900 may provide for a more uniform distribution of the reduced effective CTE around the entire circumference of the duct 900. The smaller size of the strands may also facilitate post-production machining and cutting operations on the duct (as compared to having to cut through larger, rigid reinforcing members).

Figure 11:
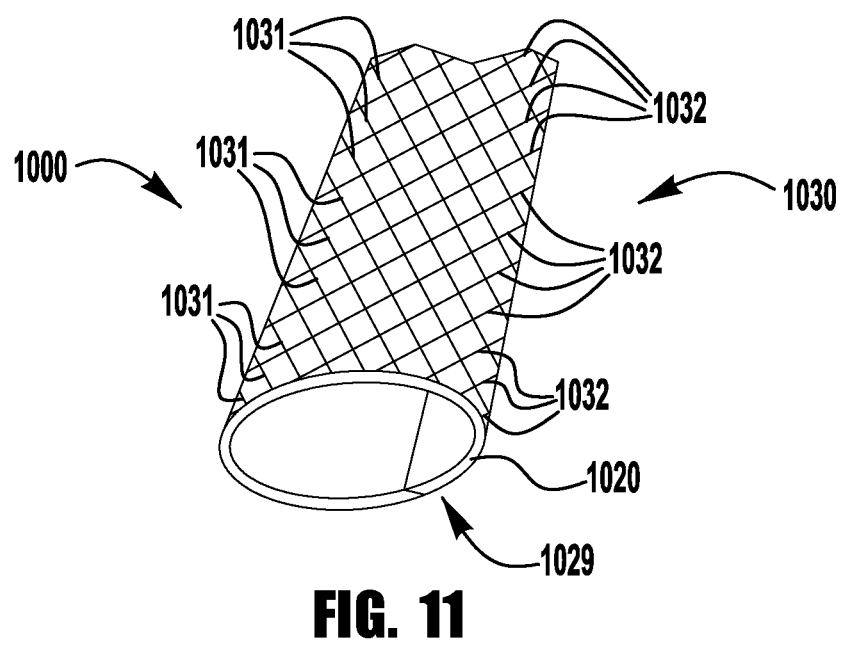
FIG. 11 is a perspective view of another composite duct, in accordance with an exemplary embodiment.

In another embodiment, as shown in FIG. 11, a reinforcing mesh 1030 may be arranged to have an array of crossing reinforcing strands 1031, 1032 oriented such that all of the mesh strands 1031, 1032 extend at least partially in the longitudinal direction, such that all of the crossing reinforcing strands contribute to a reduction in the effective CTE of the composite duct 1000.

Figure 10:
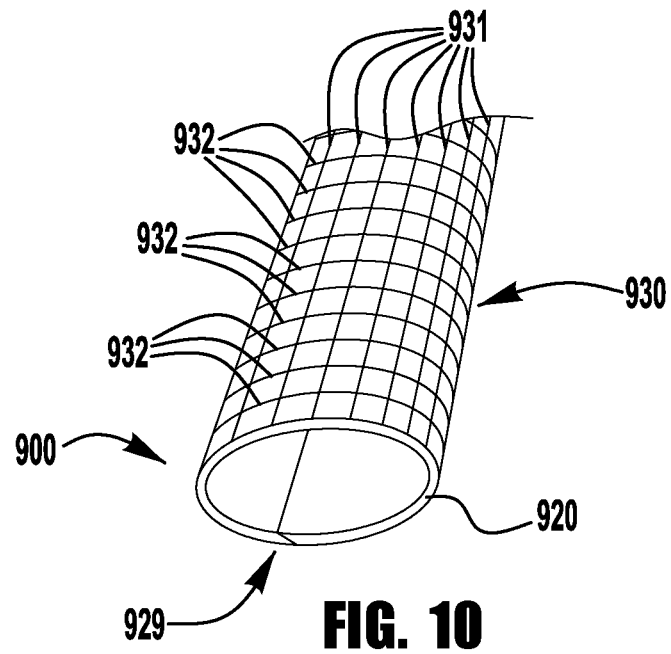
FIG. 10 is a perspective view of another composite duct, in accordance with an exemplary embodiment.

In other embodiments (not shown), a reinforcing mesh, such as, for example, one of the reinforcing meshes 930, 1030 of FIGS. 10 and 11 may be applied to an inner surface of a base element duct, or embedded between layers of a base element duct.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

What is claimed is:

1. A composite structural component comprising:
   a longitudinally extending elongated tubular duct of a first material having a first coefficient of thermal expansion and a first modulus of elasticity; and
   a plurality of longitudinally extending elongated reinforcing members of a second material, each secured to the tubular duct along a length of the reinforcing member at spaced apart locations on the tubular duct, the second material having a second coefficient of thermal expansion less than the first coefficient of thermal expansion, and a second modulus of elasticity greater than the first modulus of elasticity, such that the composite structural component has an effective coefficient of thermal expansion in the longitudinal direction that is less than 25% of the first coefficients of thermal expansion;
   wherein each of the plurality of reinforcing members is retained in a corresponding one of a plurality of longitudinally extending slits formed in a peripheral wall of the tubular duct.

2. The composite structural component of claim 1, wherein the plurality of reinforcing members together have a total cross-sectional area that is less than 1% of a total cross-sectional area of the tubular duct.

3. The composite structural component of claim 1, wherein the first material comprises a thermoplastic foam material.

4. The composite structural component of claim 1, wherein the first coefficient of thermal expansion is at least about 75 μ/° F., and the second coefficient of thermal expansion is no greater than about 20 μ/° F.

5. The composite structural component of claim 1, wherein the first modulus of elasticity is no greater than about 10 KSI, and the second modulus of elasticity is at least about 1000 KSI.

6. The composite structural component of claim 1, wherein the tubular duct includes at least one longitudinal seam, and wherein the at least one longitudinal seam is spaced apart from each of the plurality of reinforcing members.

7. The composite structural component of claim 1, wherein the plurality of longitudinally extending slits are formed in an external surface of the peripheral wall.

8. The composite structural component of claim 1, wherein the plurality of reinforcing members comprises at least three reinforcing members.

9. The composite structural component of claim 1, wherein each of the plurality of reinforcing members is secured to the elongated tubular duct by at least one of a structural adhesive, thermal bonding, solvent weld bond, mechanical fasteners, and an interference fit with the elongated tubular duct.

10. The composite structural component of claim 1, wherein each of the plurality of slits is angled with respect to a wall thickness of the tubular duct.

11. The composite structural component of claim 1, wherein each of the plurality of slits comprises a narrow slit having a depth and width selected to permit resealing of the slit over the retained reinforcing member.

12. A method of forming a composite duct, the method comprising:
    providing a sheet of thermoplastic material having first and second opposed surfaces extending to first and second edges, the thermoplastic material having a first coefficient of thermal expansion and a first modulus of elasticity;

joining the first and second edges along a seam to form a duct, with the first sheet surface facing inward and the second sheet surface facing outward; and securing a plurality of elongated reinforcing members to the sheet of thermoplastic material at spaced apart locations, the secured plurality of elongated reinforcing members extending in the longitudinal direction;

wherein the plurality of elongated reinforcing members are formed from a reinforcing material having a second coefficient of thermal expansion less than the first coefficient of thermal expansion and a second modulus of elasticity greater than the first coefficient of thermal expansion, such that the composite duct has an effective coefficient of thermal expansion in the longitudinal direction that is less than 25% of the first coefficient of thermal expansion; and wherein securing the plurality of elongated reinforcing members to the sheet of thermoplastic material comprises forming a plurality of longitudinally extending slits in the sheet and receiving each of the plurality of elongated reinforcing members in a corresponding one of the plurality of longitudinally extending slits.

13. The method of claim 12, wherein securing the plurality of elongated reinforcing members to the sheet of thermoplastic material comprises use of at least one of at least one of a structural adhesive, thermal bonding, a solvent weld bond, mechanical fasteners, and an interference fit with the sheet of thermoplastic material.

14. The method of claim 12, further comprising resealing of the slit over the retained reinforcing member.

15. The method of claim 12, wherein forming the plurality of longitudinally extending slits in the sheet comprises forming the slits before joining the first and second edges along the seam to form the duct.

16. A structural assembly comprising:
a support member of a first material having a first coefficient of thermal expansion and a first modulus of elasticity; and
a composite structural component connected to the support member along a length of the composite structural component, comprising:
an elongated tubular duct of a second material having a second coefficient of thermal expansion and a second modulus of elasticity, the second coefficient of thermal expansion being greater than the first coefficient of thermal expansion, the tubular duct extending longitudinally along the length of the composite structural component; and
a plurality of longitudinally extending reinforcing members of a third material, each secured to the tubular duct along a length of the reinforcing member at spaced apart locations on the tubular duct, the third material having a third coefficient of thermal expansion less than the second coefficient of thermal expansion, and a third modulus of elasticity greater than the second modulus of elasticity, such that the composite structural component has an effective coefficient of thermal expansion in the longitudinal direction that is within 30 $\mu/°$ F. of the first coefficient of thermal expansion;
wherein each of the plurality of reinforcing members is retained in a corresponding one of a plurality of longitudinally extending slits formed in a peripheral wall of the tubular duct.

17. The assembly of claim 16, wherein the first material comprises at least one of metal and fiber/thermoplastic composite.

18. The assembly of claim 16, wherein the second material comprises a thermoplastic foam material.

19. The assembly of claim 16, wherein the third material comprises one of a metal, a ceramic, a thermoplastic, a thermoplastic composite including at least one of carbon fiber, glass fiber, and aramid fiber, and a fiber reinforced thermoset including at least one of carbon fiber, glass fiber, and aramid fiber.

20. The assembly of claim 16, wherein the first coefficient of thermal expansion is no greater than 15 $\mu/°$ F.

* * * * *